United States Patent
Nogle

[11] Patent Number: 6,065,581
[45] Date of Patent: May 23, 2000

[54] CAMMING MANUAL LEVER FOR PULL-OUT LOAD

[75] Inventor: Thomas D. Nogle, Troy, Mich.

[73] Assignee: DaimlerChrysler Corporation, Auburn Hills, Mich.

[21] Appl. No.: 09/282,987

[22] Filed: Mar. 31, 1999

[51] Int. Cl.[7] .................................................. B60T 1/06
[52] U.S. Cl. ........................... 192/219.5; 188/31; 74/518
[58] Field of Search ................... 188/31, 69; 192/219.4, 192/219.5; 74/518

[56] References Cited

U.S. PATENT DOCUMENTS

| | | |
|---|---|---|
| 2,875,856 | 3/1959 | Mrlik et al. . |
| 3,700,080 | 10/1972 | Delorean . |
| 3,912,050 | 10/1975 | Iwanaga et al. . |
| 4,089,394 | 5/1978 | Haupt et al. . |
| 4,223,768 | 9/1980 | Iwanaga . |
| 4,310,081 | 1/1982 | Kolacz . |
| 4,474,085 | 10/1984 | DeVogelaere et al. . |
| 4,614,256 | 9/1986 | Kuwayama et al. . |
| 4,660,443 | 4/1987 | Simancik . |
| 4,667,783 | 5/1987 | Sugano et al. . |
| 4,690,011 | 9/1987 | Sakai et al. . |
| 4,727,967 | 3/1988 | Ogasawara et al. . |
| 4,907,681 | 3/1990 | Kuusik et al. . |
| 4,916,961 | 4/1990 | Holbrook et al. . |
| 4,982,620 | 1/1991 | Holbrook et al. . |
| 5,009,116 | 4/1991 | Ordo et al. . |
| 5,009,117 | 4/1991 | Ordo et al. . |
| 5,009,118 | 4/1991 | Raszkowski et al. . |
| 5,295,412 | 3/1994 | Donato et al. . |
| 5,526,909 | 6/1996 | Ohkawa . |
| 5,630,339 | 5/1997 | Tuday . |
| 5,685,406 | 11/1997 | Crum et al. . |
| 5,794,748 | 8/1998 | Heuver et al. . |

*Primary Examiner*—Charles A. Marmor
*Assistant Examiner*—Saúl Rodríguez
*Attorney, Agent, or Firm*—Marc Lorelli

[57] ABSTRACT

A park lock mechanism for a transmission of a vehicle having a pawl pivotally mounted adjacent a park gear. The pawl selectively engages the park gear to prevent rotation of an output shaft. The mechanism also includes pawl actuator member having a generally flat portion on one end and an engaging surface on another end. The pawl actuator member selectively engages the engaging surface with or disengages the engaging surface from the park pawl. The mechanism further includes a manual lever, which rotates about an axis. The manual lever includes a first contact surface and a second contact surface; wherein the first contact surface is spaced closer to the axis than the second contact surface. Upon rotation of the manual lever in a first direction, the second contact surface drives the generally flat portion of the pawl actuator member to engage the pawl actuator member with the pawl. Upon rotation of the manual lever in a second direction, the first contact surface drives the generally flat portion of the pawl actuator member to disengage the pawl actuator member from the pawl. The force required to disengage the pawl actuator member and the park pawl is less than the usual, prior art force required to disengage the pawl actuator member and the park pawl. That is to say, the invention reduces the driver effort needed to disengage "Park."

10 Claims, 5 Drawing Sheets

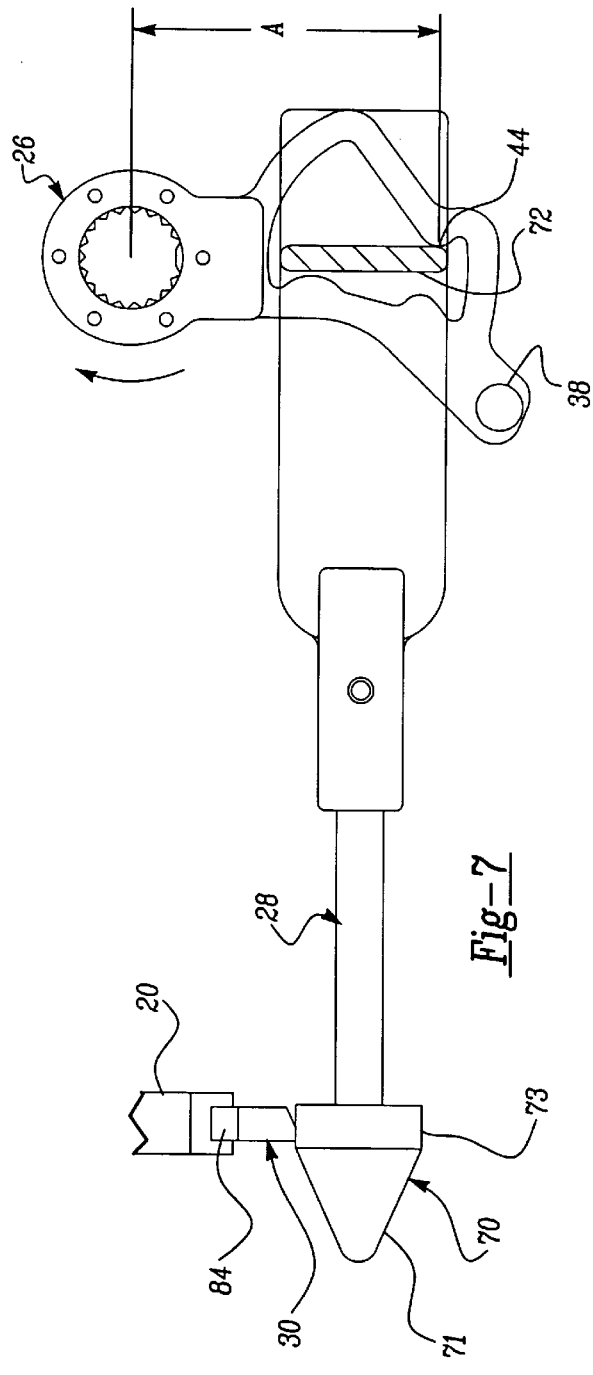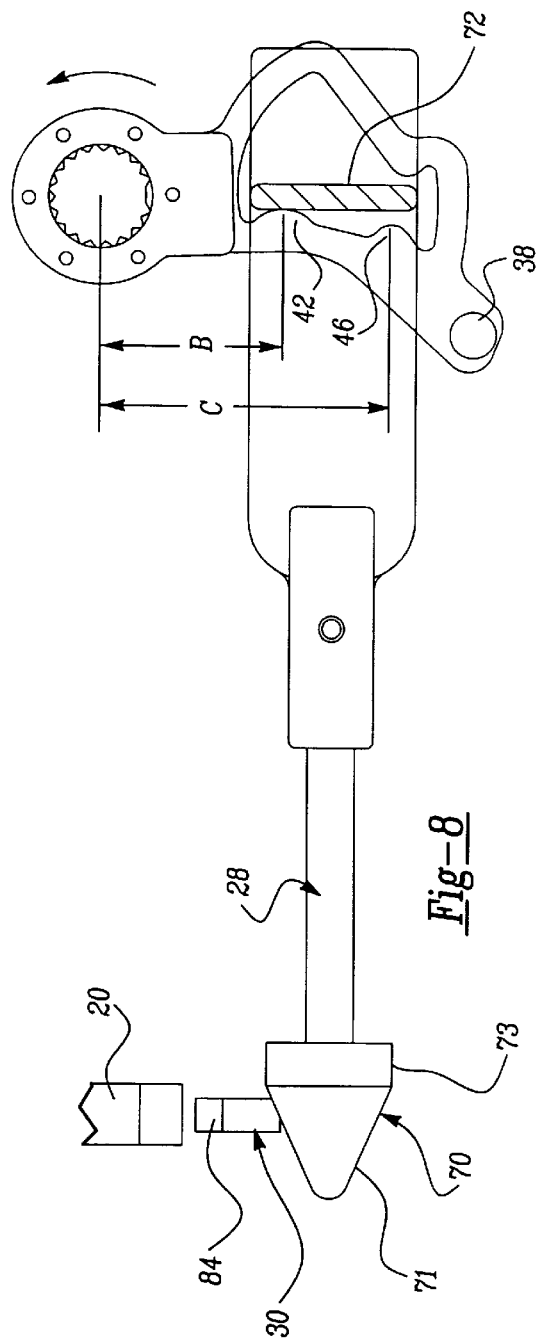

CAMMING MANUAL LEVER FOR PULL-OUT LOAD

CROSS-REFERENCE TO RELATED APPLICATIONS

The present application is related to the following co-pending applications, which are incorporated herein by reference:

U.S. Ser. No. 09/283,073 for an invention entitled "LINEAR TRANSLATION OF PRNDL"; and U.S. Ser. No. 09/382,375 for an invention entitled "PRNDL CODE USING 5 PINS."

FIELD OF THE INVENTION

The present invention relates to a park lock mechanism of an automatic transmission and, more particularly, to a park lock mechanism requiring less force to disengage a park pawl from a park gear than is typical of common current state-of-art systems.

BACKGROUND OF THE INVENTION

As is well known, automatic transmissions for vehicles include a manual shift lever, which is indirectly actuated by the operator of the vehicle to select from a plurality of predetermined operating modes, such as Park, Reverse, Neutral, Over-drive, Drive, and Low. The manual lever is connected to a manual valve disposed within a valve body in the transmission. The manual lever actuates a manual valve plate that initiates hydraulic manual valve port changes in the manual valve corresponding to the operating mode selected by the operator, thereby engaging the gear ratio selected.

When the operator of the vehicle selects the "Park" mode, a park lock mechanism is engaged to prevent rotation of the output shaft of the transmission. Generally, the park lock mechanism is operated by reciprocating a pawl actuator rod, which is pivotally mounted to the manual lever. The pawl actuator rod typically includes a generally conical end opposite the pivot connection end. The pawl actuator rod, thus, drives the conical end against a park pawl. The pawl is mounted on a pivot shaft attached to the transmission housing. A pawl tooth of the park pawl then meshes with a park gear. The park gear is fixed to the rotatable transmission output shaft to rotate therewith. Engagement of the park pawl with the park gear thereby prevents rotation of the transmission output shaft.

In operation, when the "Park" mode is selected, the manual lever rotates in a first direction to linearly translate the pawl actuator rod until the conical end of the pawl actuator rod engages with the park pawl. Most often, the park gear will not be in alignment with the park pawl tooth when the driver selects "Park." For this reason, the conical end of the pawl actuator rod is spring loaded, such that the driver can fully select "Park," and actual "Park" will automatically occur as soon as the vehicle rolls slightly forward or backward, allowing the park pawl to engage between the teeth of the park gear. This engagement between the park pawl and the park gear prevents rotation of the transmission output shaft. This spring-loaded conical end of the pawl actuator rod also avoids the catastrophic engagement of "Park" if a driver should inadvertently select "Park" while travelling at speed, since the dynamics of the system will cause the park pawl to ratchet (or bounce) across the gear teeth above 3-5 mph. Since this spring-engaged mechanism requires significant linear stroke, it must thereby be actuated by a relatively long lever-arm from the manual lever. When a mode other than "Park" is selected, the manual lever rotates in a second direction to linearly translate the pawl actuator rod until the conical end of the pawl actuator rod disengages from the park pawl. Since the park pawl is spring biased to disengage from the park gear even when there is no tendency for the vehicle to roll in either direction, disengagement of the conical end of the pawl actuator rod from the park pawl causes the park pawl to disengage from the park gear to enable free rotation of the transmission output shaft.

It should be appreciated that an operator must be able to disengage "Park" even when the vehicle has a strong tendency to roll, such as on a steep grade or with the tires compressed against a curb. Therefore, the park pawl tooth-form and park gear teeth-forms must have pressure angles (both forward and reverse) to assure self-ejection. These high self-ejection forces in turn generate a very high clamping load on the cylindrical portion of the conical end of the park pawl actuator rod. This high clamping load creates a high friction force to resist pulling the park pawl actuator, and its cylindrical portion, out from under the park pawl.

Thus, it can be appreciated that the prior art park lock mechanism includes numerous disadvantages. Specifically, the pawl actuator rod is pivotally coupled to the manual lever at a predetermined distance from the rotation axis of the manual lever. This arrangement thereby defines a single stroke length of the manual lever to engage or disengage the park pawl. However, it should be appreciated by one skilled in the art that to engage the park pawl in a "Park" position, the force applied to the pawl actuator rod by the operator must overcome the spring force of the rod spring acting on the conical end and the spring force of the park pawl spring acting on the park pawl. Preferably, a long stroke length of the manual lever is used to compress these springs to minimize the effort required by the operator. However, when disengaging the park pawl from the "Park" position, when a strong rolling load exists, a high force is required. Thus, a short stroke length of the manual lever is preferred to disengage the park pawl from the "Park" position to minimize the effort required by the operator. Once initial friction is overcome (motion started), the full ejection should preferably follow.

Accordingly, there exists a need in the relevant art to provide a park lock mechanism for an automatic transmission that is capable of varying the stroke length of the manual lever depending upon whether the park pawl is being engaged or disengaged from the "Park" position. Furthermore, there exists a need in the relevant art to provide a manual lever in a park lock mechanism that requires less force to disengage a pawl actuator rod from a park pawl than prior practice has provided.

SUMMARY OF THE INVENTION

In accordance with the broad teachings of this invention, a park lock mechanism for a transmission of a vehicle having an advantageous construction is provided, wherein the transmission includes a park gear fixed to a rotatable output shaft to rotate therewith. The park lock mechanism includes a pawl pivotally mounted to the transmission housing adjacent the park gear. The pawl selectively engages the park gear to prevent rotation of the output shaft. The mechanism also includes pawl actuator member having a generally flat portion on one end and an engaging surface on another end. The pawl actuator member selectively engages the engaging surface with or disengages the engaging surface from the park pawl. The mechanism further includes a manual lever, which rotates about an axis. The manual lever includes a first contact surface and a second contact surface; wherein the first contact surface is spaced closer to the axis than the second contact surface. Upon rotation of the manual lever in a first direction, the second contact surface drives the generally flat portion of the pawl actuator member to engage the pawl actuator member with the pawl. Upon rotation of the manual lever in a second direction, the first contact surface drives the generally flat portion of the pawl actuator member to disengage the pawl actuator member from the pawl. The force required to engage the pawl actuator is never great, but a moderately long stroke is required, thus requiring the second contact surface to be far from the pivot axis. Conventionally, this same pivot is used to disengage "Park," even though the disengagement forces are often very high. This invention provides the vehicle operator with a shorter disengagement lever length, increasing the mechanical advantage, so it is relatively easier to disengage "Park."

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 7 is a front view of the manual lever and pawl actuator member engaged in the "Park" position; and FIG. 8 is a front view, similar to FIG. 7, of the manual lever and pawl actuator member disengaged from the "Park" position.

DETAILED DESCRIPTION OF THE PREFERRED EMBODIMENTS

Figure 1:
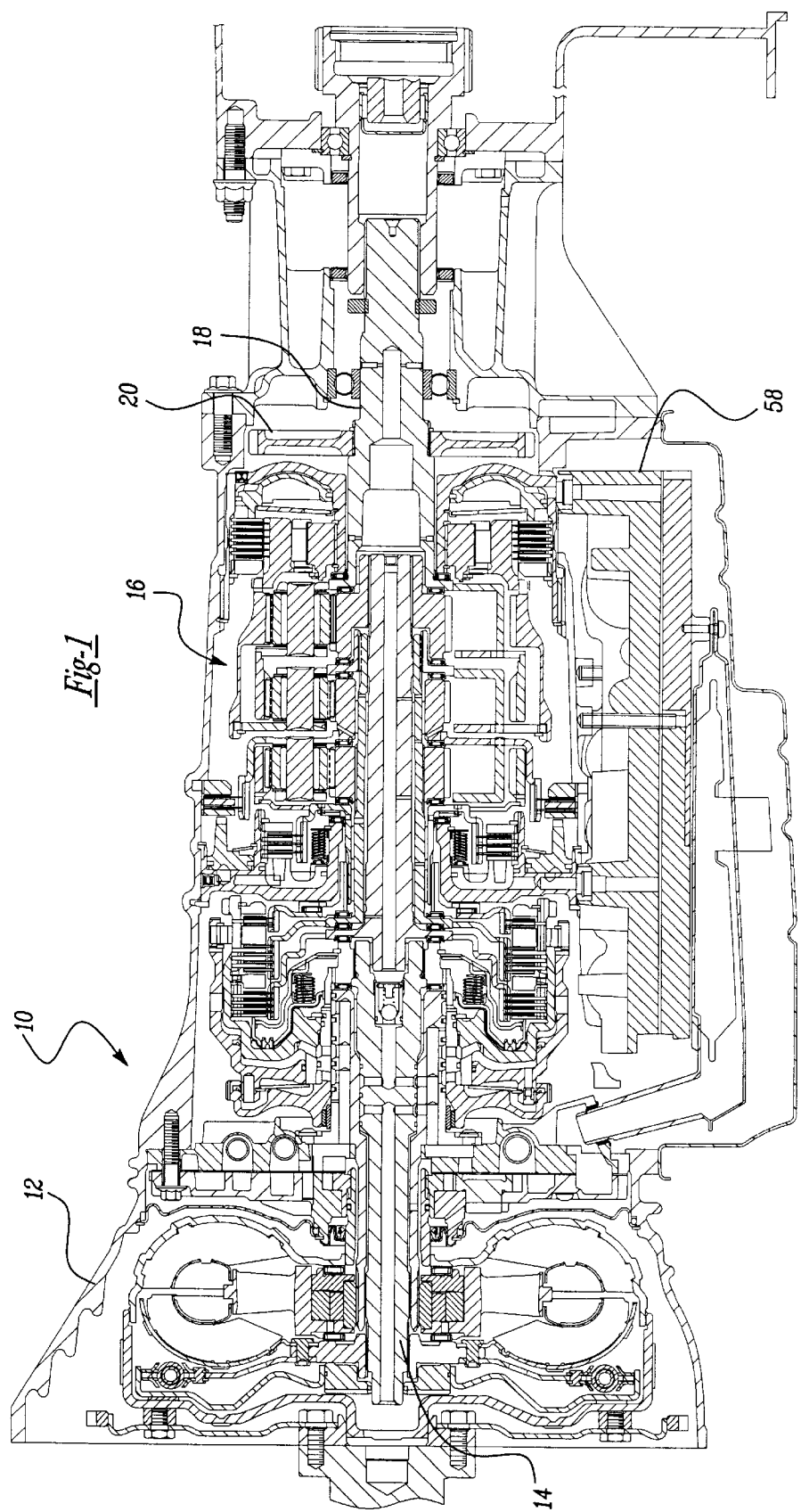
FIG. 1 is a cross-sectional view of an automatic transmission according to the teachings of the present invention.

The following description of the preferred embodiment is merely exemplary in nature and is in no way intended to limit the invention, its application, or uses. For example, the park lock mechanism of the present invention may have utility in steering column lock mechanisms or the like.

Referring to the drawings, an automatic transmission 10 for a vehicle is shown having a transmission housing 12. An input shaft 14 is rotatably supported at least partially within housing 12 and is coupled to an engine (not shown) of the vehicle to deliver power to automatic transmission 10. A power transmitting device 16 is coupled to input shaft 14 for transmitting power from input shaft 14 through one of a plurality of gear ratios corresponding to a predetermined operating modes—Park, Reverse, Neutral, Over-drive, Drive, and Low (PRNODDL)—selected by an operator of the vehicle. Power transmitting device 16 transmits the power to an output shaft 18 for driving the wheels (not shown) of the vehicle. Output shaft 18 is rotatably supported at least partially within housing 12. Transmission 10 further includes a park gear 20 mounted to output shaft 18 to rotate therewith. Upon engagement of transmission 10 into the "Park" position by the operator, park gear 20 is fixed to prevent rotation of output shaft 18 relative to housing 12.

Figure 2:
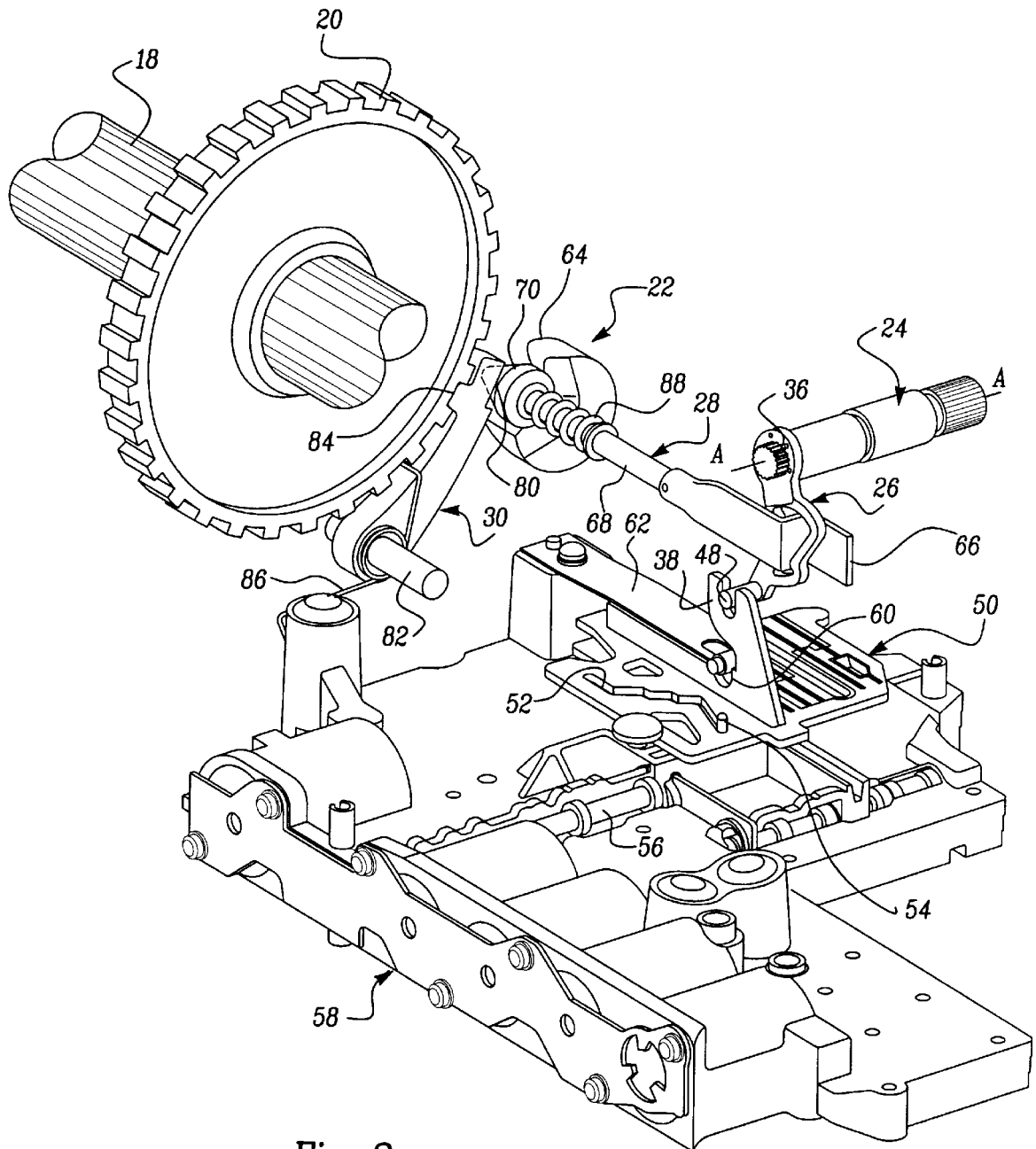
FIG. 2 is a perspective view of a park lock mechanism disposed within the transmission being engaged in a "Park" position.
Figure 3:
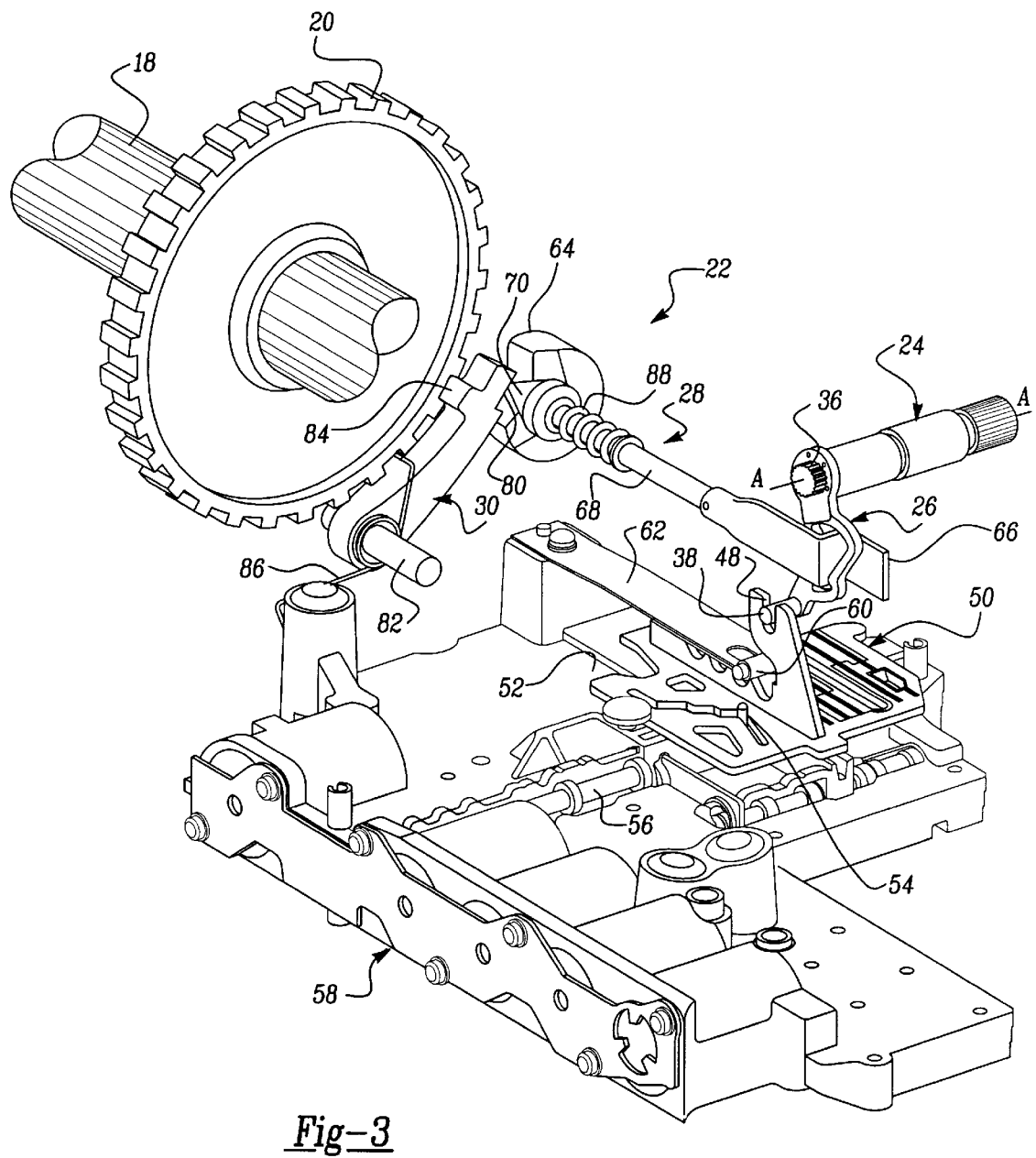
FIG. 3 is a perspective view, similar to FIG. 2, of the park lock mechanism being disengaged from the "Park" position.

As best seen in FIGS. 2 and 3, transmission 10 further includes a park lock mechanism 22 capable of preventing rotation of park gear 20 when the "Park" position is selected. Park lock mechanism 22 includes a manual shaft 24, a manual lever 26, a pawl actuator member 28, and a park pawl 30. Manual shaft 24 is rotatably supported in housing 12 such that it rotates about axis A—A. Manual shaft 24 is actuated in response to the operator selecting one of the predetermined operating modes (PRNODDL).

Figure 4:
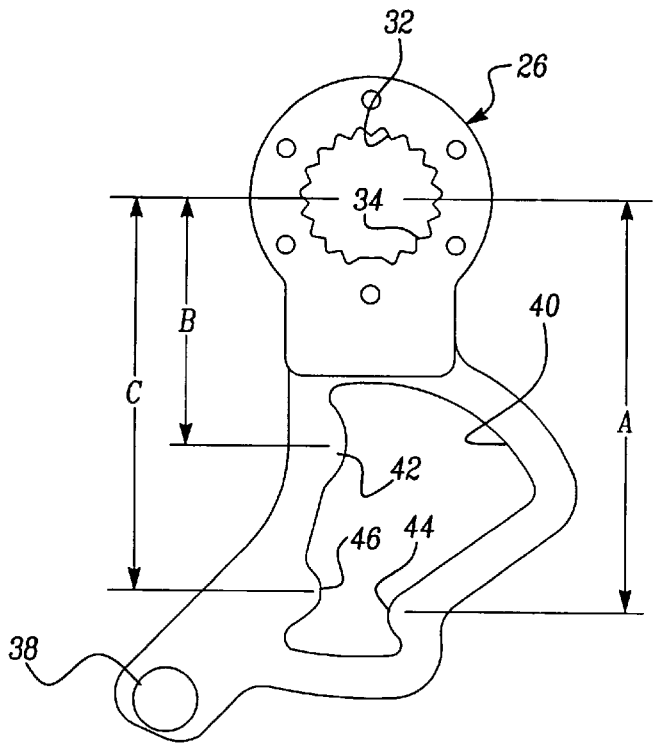
FIG. 4 is a front view of a manual lever.

Referring to FIGS. 2–4, manual lever 26 is mounted to manual shaft 24 for rotation therewith. More particularly, manual lever 26 includes a mounting aperture 32. Mounting aperture 32 includes a plurality of teeth 34 formed therein that engages a plurality of teeth 36 formed on an end of manual shaft 24. It should be noted, however, that any method of coupling manual shaft 24 and manual lever 26 may be used that enables manual lever 26 to rotate with manual shaft 24. Accordingly, manual lever 26 further rotates about axis A—A.

As best seen in FIG. 4, manual lever 26 further includes a pin 38 and an opening 40 having an inwardly-projecting first contact surface 42, an inwardly-projecting second contact surface 44, and an inwardly-projecting third contact surface 46. Pin 38 is adapted to engage a pin slot 48 (FIGS. 2 and 3) formed in a linearly translated plate member 50. Plate member 50 includes a cam groove 52 for camming interconnection with a manual valve pin 54. Manual valve pin 54 is coupled with a hydraulic manual valve 56 disposed in a valve body 58 for controlling the hydraulic fluid flow through valve body 58 in direct response to driver selection. Plate member 50 further includes a series of detents 60 (only one shown) for receiving a detent spring 62. The position of detents 60 corresponds to the predetermined operating modes (PRNODDL) to correctly position the hydraulic manual valve 56 to engage the selected transmission operation mode.

Figure 5:
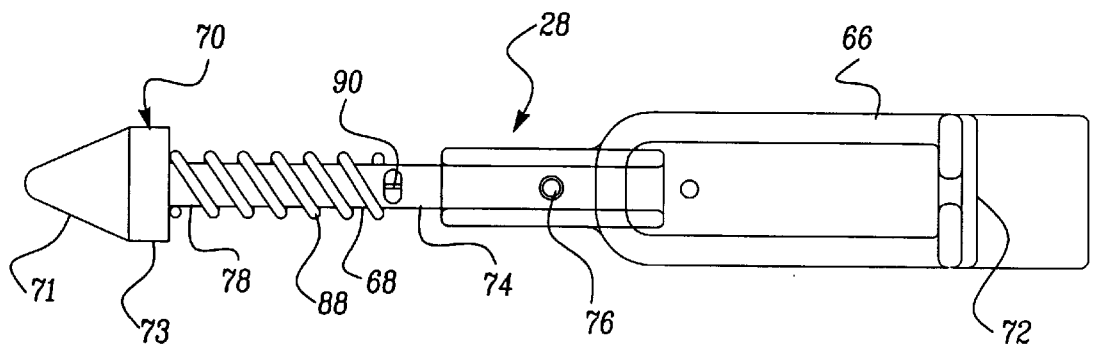
FIG. 5 is a front view of a pawl actuator member.
Figure 6:
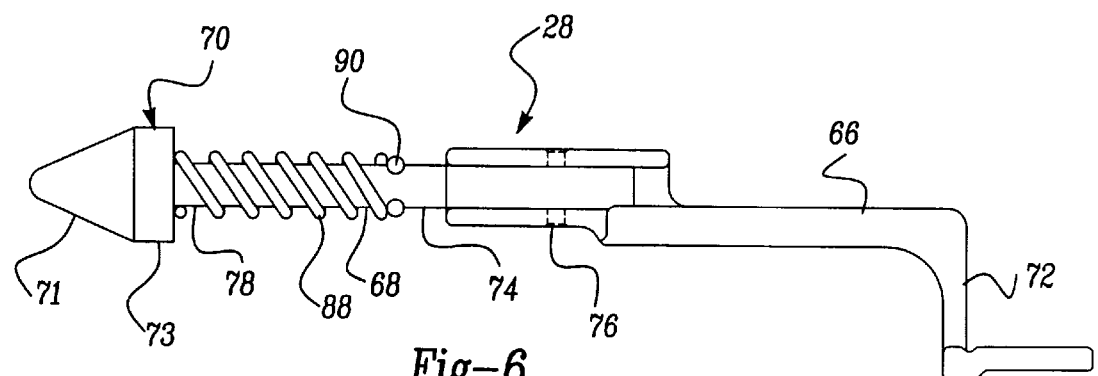
FIG. 6 is a top view of the pawl actuator member.

Referring now to FIGS. 2, 3, 5, and 6, pawl actuator member 28 is linearly translated within housing 12 of transmission 10. That is, a guide 64 is mounted to housing 12 to guide pawl actuator member 28 through a generally linear motion. Pawl actuator member 28 includes a coupling portion 66, a rod portion 68, and a rod end portion 70. It should be appreciated that pawl actuator member 28 may be formed from a single unitary member or a plurality of members coupled together. As best seen in FIGS. 5 and 6, coupling portion 66 of pawl actuator member 28 defines a generally flat portion 72. Generally flat portion 72 is adapted to engage at least one of the contact surfaces 42, 44, 46 of manual lever 26 such that rotation of manual lever 26 drives pawl actuator member 28. Such operation will be described below.

Coupling portion 66 is mounted to a first end 74 of rod portion 68 using a fastener (not shown) disposed through a hole 76 formed in rod portion 68, as shown, or by other suitable means known in the art. Rod end 70 is mounted to a second end 78 of rod portion 68. Rod end 70 selectively engages a corresponding ramp surface 80 formed on park pawl 30. Specifically, rod end 70 includes a conical portion 71 and a cylindrical portion 73. Conical portion 71 of rod end 70 provides the engagement stroke so as to engage park pawl 30 with park gear 20. Cylindrical portion 73 of rod end 70 supports the in-park loads exerted by park pawl 30.

As best seen in FIGS. 2 and 3, park pawl 30 is rotatably mounted to housing 12 using a pivot pin 82. Park pawl 30 includes a pawl tooth 84 formed near an end of park pawl 30. Pawl tooth 84 engages the gear teeth of park gear 20 when conical portion 71 of rod end 70 engages ramp surface 80 of park pawl 30, thereby pivoting park pawl 30 about pivot pin 82. Park pawl 30 is biased by a park pawl spring 86 such that pawl tooth 84 of park pawl 30 is normally disengaged from park gear 20, thereby enabling output shaft 18 of transmission 10 to rotate freely.

Preferably, rod end 70 of pawl actuator member 28 is slidably mounted to second end 78 of rod portion 68 and is provided with a rod spring 88, which engages cylindrical portion 73 of rod end 70 at one end and a detent 90 formed in rod portion 68 at the other end. Rod spring 88 enables rod end 70 to move relative to rod portion 68 when the "Park" position is selected while the vehicle is moving. That is, motion of the vehicle rotates output shaft 18, which rotates park gear 20. Rotation of park gear 20 prevents pawl tooth 84 of park pawl 30 from engaging the teeth of park gear 20; thus, conical portion 71 of rod end 70 may not engage park pawl 30 until gear speed slows to a very low speed. Accordingly, rod spring 88 enables pawl actuator member 28 to linearly translate relative to rod end 70 and maintain a load on rod end 70 until park gear 20 slows to a near stop and park pawl 30 then engages park gear 20.

During operation, the operator manually selects one of the predetermined operating modes (PRNODDL), thereby rotating manual shaft 24 and manual lever 26. When the "Park" position is being engaged (see FIGS. 2 and 7), manual lever 26 is rotated in a clockwise direction. This clockwise rotation of manual lever 26 causes pin 38 of manual lever 26 to cam within pin slot 48 of plate member 50. Such camming motion of pin 38 linearly translates plate member 50 (to the left in FIG. 2), thereby actuating manual valve pin 54 of hydraulic manual valve 56 until hydraulic manual valve 56 is set in the "Park" position. Moreover, the clockwise rotation of manual lever 26 drives pawl actuator member 28 such that conical portion 71 of rod end 70 engages ramp surface 80 of park pawl 30, thereby rotating and engaging park pawl 30 with park gear 20 (when the gear 20 is aligned with or allowed to rotate to alignment with tooth 84) until cylindrical portion 73 of rod end 70 engages and supports park pawl 30. More particularly, when manual lever 26 is rotated in a clockwise direction, second contact surface 44 of manual lever 26 contacts and drives generally flat portion 72 of pawl actuator member 28. The contact point between second contact surface 44 and generally flat portion 72 is at a radius A from axis A—A. It should be appreciated that the length of radius A provides the long stroke necessary to assure full "Park" engagement, at the same time appropriately loading park pawl spring 86 and rod spring 88. The relatively low force required to overcome the spring force of springs 86, 88 is unnoticeable by the operator even though performed at a relatively poor mechanical advantage.

Similarly, when the "Park" position is being disengaged (FIGS. 3 and 8), manual lever 26 is rotated in a counter-clockwise direction. This counter-clockwise rotation of manual lever 26 causes pin 38 of manual lever 26 to cam within pin slot 48 of plate member 50. This camming motion of pin 38 linearly translates plate member 50 (to the right in FIG. 3), thereby actuating manual valve pin 54 of hydraulic manual valve 56 such that hydraulic manual valve 56 is set in one of the predetermined operating modes other than "Park." Furthermore, the counter-clockwise rotation of manual lever 26 pulls pawl actuator member 28, thereby allowing expulsion of park pawl 30 from park gear 20. More particularly, when manual lever 26 is rotated in a counter-clockwise direction, first contact surface 42 of manual lever 26 contacts and drives generally flat portion 72 of pawl actuator member 28. The contact point between first contact surface 42 and generally flat portion 72 is at a radius B from axis A—A. It should be appreciated that radius B is smaller than radius A. This provides a shorter stroke but a greater mechanical advantage. The shorter stroke of first contact surface 42, thus, provides a stronger force over a short distance. This stronger force over a shorter distance is typically preferred for releasing a transmission from a "Park" position. As one skilled in the art will appreciate, a smaller radius further leads to lower shaft torque in manual shaft 24.

It should be understood that any tendency for the vehicle to roll when in "Park" is translated to pawl 30 by gear 20. The greater the tendency to roll, the greater the load on park pawl 30. This same force increasingly tries to eject pawl tooth 84 from gear 20, thus creating a high radial load on cylindrical portion 73 of rod end 70. Resulting friction forces, thus, require a high axial force to pull cylindrical poriton 73 of rod end 70 from beneath park pawl 30. It must also be appreciated that once rod end 70 is pulled a small amount, such that the high ejection load from the gear is reacted by the conical portion 71 of rod end 70, then complete self-ejection will follow immediately. That is, only a short, forced stroke is required for disengagement, allowing for a shorter lever arm with better mechanical advantage.

Still referring to FIGS. 3 and 8, once manual lever 26 rotates far enough to fully to disengage pawl actuator member 28 from park pawl 30, third contact surface 46 of manual lever 26 engages and continues to drive generally flat portion 72 of pawl actuator member 28. That is, third contact surface 46 primarily engages and drives pawl actuator member 28 when manual lever 26 is rotated in a counter-clockwise direction beyond the out-of-park position. It should be noted, however, that third contact surface 46 only engages generally flat portion 72 of pawl actuator member 28 once pawl actuator member 28 is disengaged from the "Park" position. The contact point between third contact surface 46 and generally flat portion 72 is at a radius C from axis A—A. It should be appreciated that radius C is generally equal to radius A, thereby providing a long stroke. This long stroke enables pawl actuator member 28 to be conveniently translated whenever a predetermined operating mode, other than "Park," is selected.

The park lock mechanism of the present invention is capable of varying the stroke length of the manual lever depending upon whether the park pawl is being engaged or disengaged from the "Park" position. This capability enables the operator of the vehicle to easily pull the transmission out of "Park" relative to conventional park lock mechanisms having a fixed stroke length.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A park lock mechanism for a transmission of a vehicle, said transmission having a park gear fixed to a rotatable output shaft to rotate therewith, said park lock mechanism comprising:

a pawl adapted to be pivotally mounted adjacent the park gear, said pawl being adapted to selectively engage the park gear to prevent rotation of the output shaft;

a pawl actuator member defining a first and a second end, said first end having a generally flat portion, said second end having an engaging surface, said pawl actuator member being selectively actuatable to engage said engaging surface with or disengage said engaging surface from said pawl; and a manual lever being rotatable about an axis, said manual lever having a first contact surface and a second contact surface, said first contact surface being spaced closer to said axis than said second contact surface, whereby upon rotation of said manual lever, said second contact surface drives said generally flat portion of said pawl actuator member to engage said engaging surface of said pawl actuator member with said pawl or said first contact surface drives said generally flat portion of said pawl actuator member to disengage said engaging surface of said pawl actuator member from said pawl.

2. The park lock mechanism according to claim 1, further comprising:

a pawl actuator member guide mounted to a housing of the transmission, said pawl actuator member guide supporting said pawl actuator member during actuation thereof.

3. The park lock mechanism according to claim 1 wherein said rotation of said manual lever further drives a manual valve actuating plate, thereby controlling a manual valve of the transmission.

4. The park lock mechanism according to claim 1, further comprising:

a rotatable manual shaft being integrally formed with said manual lever to rotate therewith, said manual shaft driving said manual lever in response to a manual input force from an operator.

5. The park lock mechanism according to claim 1 wherein said pawl is biased in said disengagement with the park gear.

6. An automatic transmission for a vehicle, said transmission comprising:

a housing;

a rotatable input shaft being at least partially disposed within said housing, said input shaft providing input force;

a power-transmitting device being coupled to said input shaft, said power-transmitting device providing a plurality of gear ratios;

a rotatable output shaft being at least partially disposed within said housing, said output shaft providing an output force in response to said input force and said power transmitting device;

a park gear being fixed to said output shaft to rotate therewith;

a pawl being pivotally mounted adjacent said park gear, said pawl selectively engaging said park gear to prevent rotation of said output shaft;

a pawl actuator member defining a first and a second end, said first end having a generally flat portion, said second end having an engaging surface, said pawl actuator member being selectively actuatable to engage said engaging surface with or disengage said engaging surface from said pawl; and a manual lever being rotatable about an axis, said manual lever having a first contact surface and a second contact surface, said first contact surface being spaced closer to said axis than said second contact surface, whereby upon rotation of said manual lever, said second contact surface drives said generally flat portion of said pawl actuator member to engage said engaging surface of said pawl actuator member with said pawl or said first contact surface drives said generally flat portion of said pawl actuator member to disengage said engaging surface of said pawl actuator member from said pawl.

7. The transmission according to claim 6, further comprising:

a pawl actuator member guide mounted to said housing, said pawl actuator member guide supporting said pawl actuator member during actuation thereof.

8. The transmission according to claim 6 wherein said rotation of said manual lever further drives a manual valve actuating plate, thereby controlling a manual valve of the transmission.

9. The transmission according to claim 6, further comprising:

a rotatable manual shaft being integrally formed with said manual lever to rotate therewith, said manual shaft driving said manual lever in response to a manual input force from an operator.

10. The transmission according to claim 6 wherein said pawl is biased in said disengagement with said park gear.

* * * * *